United States Patent
Chandaka et al.

(10) Patent No.: US 9,654,580 B2
(45) Date of Patent: May 16, 2017

(54) PROXY-BASED WEB APPLICATION MONITORING THROUGH SCRIPT INSTRUMENTATION

(71) Applicant: Microsoft Technology Licensing, LLC, Redmond, WA (US)

(72) Inventors: Venkata Ramanamurthy Chandaka, Sammamish, WA (US); Mihail Smacinih, Redmond, WA (US); Sourabh Guha, Redmond, WA (US); Ruhiyyih Mahalati, Redmond, WA (US); Ashvinkumar Jayantilal Sanghvi, Sammamish, WA (US); Victor Alexandrovich Mushkatin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 889 days.

(21) Appl. No.: 14/049,113

(22) Filed: Oct. 8, 2013

(65) Prior Publication Data

US 2015/0100679 A1    Apr. 9, 2015

(51) Int. Cl.
  *G06F 15/173* (2006.01)
  *H04L 29/08* (2006.01)
  *H04L 12/26* (2006.01)

(52) U.S. Cl.
  CPC .......... *H04L 67/2819* (2013.01); *H04L 67/02* (2013.01); *H04L 67/125* (2013.01); *H04L 67/22* (2013.01); *H04L 43/50* (2013.01)

(58) Field of Classification Search
  CPC .......................... H04L 67/125; H04L 67/2819

USPC ................ 709/202–203, 217–219, 223–226, 709/227–229
See application file for complete search history.

(56) References Cited

U.S. PATENT DOCUMENTS

| | | | |
|---|---|---|---|
| 7,543,051 B2 | 6/2009 | Greifeneder et al. | |
| 8,079,037 B2 | 12/2011 | Lui et al. | |
| 8,090,822 B2 | 1/2012 | Lee | |
| 8,516,040 B2 * | 8/2013 | Thota ................. | H04L 67/2814 709/203 |
| 2012/0023487 A1 | 1/2012 | Letca et al. | |
| 2013/0246630 A1 * | 9/2013 | Exton ................... | H04L 67/02 709/227 |
| 2014/0136944 A1 * | 5/2014 | Harris .................. | G06F 17/211 715/234 |
| 2014/0164404 A1 * | 6/2014 | Hunt ................ | G06F 17/30867 707/754 |

(Continued)

OTHER PUBLICATIONS

"Citratest APM Solution—End to End Response Time Monitoring—SLA", Published on: Jan. 27, 2008, Available at: http://www.tevron.com/citratest-apm.asp.

(Continued)

*Primary Examiner* — Bharat N Barot
(74) *Attorney, Agent, or Firm* — Workman Nydegger

(57) ABSTRACT

Gathering web application analytic information. A proxy requests an application resource from a web application, on behalf of a client. The proxy receives the web application resource from the web application. The proxy, instruments the web application resource with a client executable script configured to cause analytic information to be gathered when the script is executed at a client. The web application resource is forwarded to a client.

23 Claims, 3 Drawing Sheets

(56) References Cited

U.S. PATENT DOCUMENTS

| | | | |
|---|---|---|---|
| 2014/0280925 A1* | 9/2014 | Wee | H04L 67/1002 709/224 |
| 2015/0019679 A1* | 1/2015 | Prince | H04L 67/2823 709/226 |
| 2016/0119344 A1* | 4/2016 | Freitas Fortuna dos Santos | H04L 63/1466 726/7 |

OTHER PUBLICATIONS

Simmonds, et al., "Monitoring and Recovery of Web Service Applications", In Book—The Smart Internet, Nov. 2010, 40 pages.

Halima, et al., "Non-intrusive QoS Monitoring and Analysis for Self-Healing Web Services", In the First IEEE International Conference on the Applications of Digital Information and Web Technologies, Aug. 4, 2008, 6 pages.

Moser, et al., "Non-Intrusive Monitoring and Service Adaptation for WS-BPEL", In Proceedings of the 17th International Conference on World Wide Web, Apr. 21, 2008, 10 pages.

Wei, et al., "sMonitor: A Non-Intrusive Client-Perceived End-to-End Performance Monitor of Secured Internet Services", In Proceedings of the Annual Conference on USENIX Annual Technical Conference, May 2006, 6 pages.

Ferragina, et al., "A Personalized Search Engine Based on Web-Snippet Hierarchical Clustering", In Special Interest Tracks and Posters of the 14th International Conference on World Wide Web, May 10, 2005, 10 pages.

Herbold, et al., "Improved Bug Reporting and Reproduction through Non-intrusive GUI Usage Monitoring and Automated Replaying", In Proceedings of the IEEE Fourth International Conference on Software Testing, Verification and Validation Workshops, Mar. 21, 2011, 10 pages.

Kiciman, et al., "Live Monitoring: Using Adaptive Instrumentation and Analysis to Debug and Maintain Web Applications", In Proceedings of the 11th USENIX Workshop on Hot Topics in Operating Systems, May 7, 2005, 6 pages.

* cited by examiner

PROXY-BASED WEB APPLICATION MONITORING THROUGH SCRIPT INSTRUMENTATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnected computing has allowed for individuals to obtain resources from web applications. For example, a user can connect to a web application to obtain resources such as web documents, images, files, etc. Recently, there has been interest in collecting and/or generating analytic information regarding users interacting with web applications. Such analytic information generally falls into two categories: usage and performance. Usage information relates to how resources are accessed. For example, usage information may track what resources are being requested, how frequently resources are being requested, who is requesting resources, etc. Performance information relates to how resources are provided. For example, performance information may indicate how long it takes to retrieve resources how quickly resources are rendered, etc. Monitoring solutions provide web application owners with the ability to measure, collect, analyze and finally report web application usage and performance characteristics for the purposes of understanding and optimizing web applications for customers.

Previous analytic solutions required web application developers themselves to manually instrument their application code (e.g. code delivered to web browsers), with a script (often JavaScript) to obtain or generate analytic information. This can cause the application to "break" on one or more browser or other client applications that use the web application. This could be addressed by implementing controlled exposure to expose the solution to just few percent of customers thereby limiting the impact to all customers. Alternatively, solutions may implement a private deployment of entire web application and instrument it with a script and test for all possible client operations. Both solutions are brute force methods and very costly. Thus, often times, customers are in a dilemma whether to employ a monitoring solution to monitor their application especially if it is popular because the cost of ensuring that applications works without issues is a costly and challenging affair.

Some example analytic solutions are Tofino available from Microsoft Corporation of Redmond Wash., Google Analytics available from Google Corporation of Mountain View, Calif., Yahoo! Web analytics available from Yahoo! Inc. of Sunnyvale, Calif., GoStats available from gostats.com, extreme tracking available from extremetracking.com, Clicky available from Roxr Software of Portland, Oreg., etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a web application computing environment. The method includes acts for gathering web application analytic information. A proxy requests an application resource from a web application, on behalf of a client. The proxy receives the web application resource from the web application. The proxy, instruments the web application resource with a client executable script configured to cause analytic information to be gathered when the script is executed at a client. The web application resource is forwarded to a client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments can be configured to verify monitoring solutions like Microsoft's Tofino CSM, available from Microsoft Corporation of Redmond, Wash., Google analytics available from Google Corporation of Mountain View, Calif., New Relic available from New Relic Inc. of San Francisco, Calif., etc. for monitoring Web 2.0, Web 1.0 applications. The monitoring solutions instrument web application with a script (often javascript) to capture monitoring metrics from the target application. A web application differs from a web service in that a web application provides an application that is used to obtain web resources where the application provides the direct user interface. In contrast, a web service acts as a repository, such as a database, where the end user interface is provided by some other application that is able to access web resources provided by the web service. Thus, a web application can be a front end to a web service, but an end user does not typically interface directly with a web service without an intervening application. Embodiments allow for fully verifying different the monitoring solutions in a non-intrusive way by not requiring developers to instrument target web applications with the script. Instead, a proxy can be interposed between one or more web browsers and a web application. The proxy can intercept requests from the browser and responses from the web application. The proxy can then automatically add script to the responses (e.g. resources) from the web application that can be used for application monitoring and verification. Additionally, automated testing can be performed to ensure that addition of the scripts to the application resources does not break the application with respect to one or more web clients (e.g. web browsers).

Figure 1:
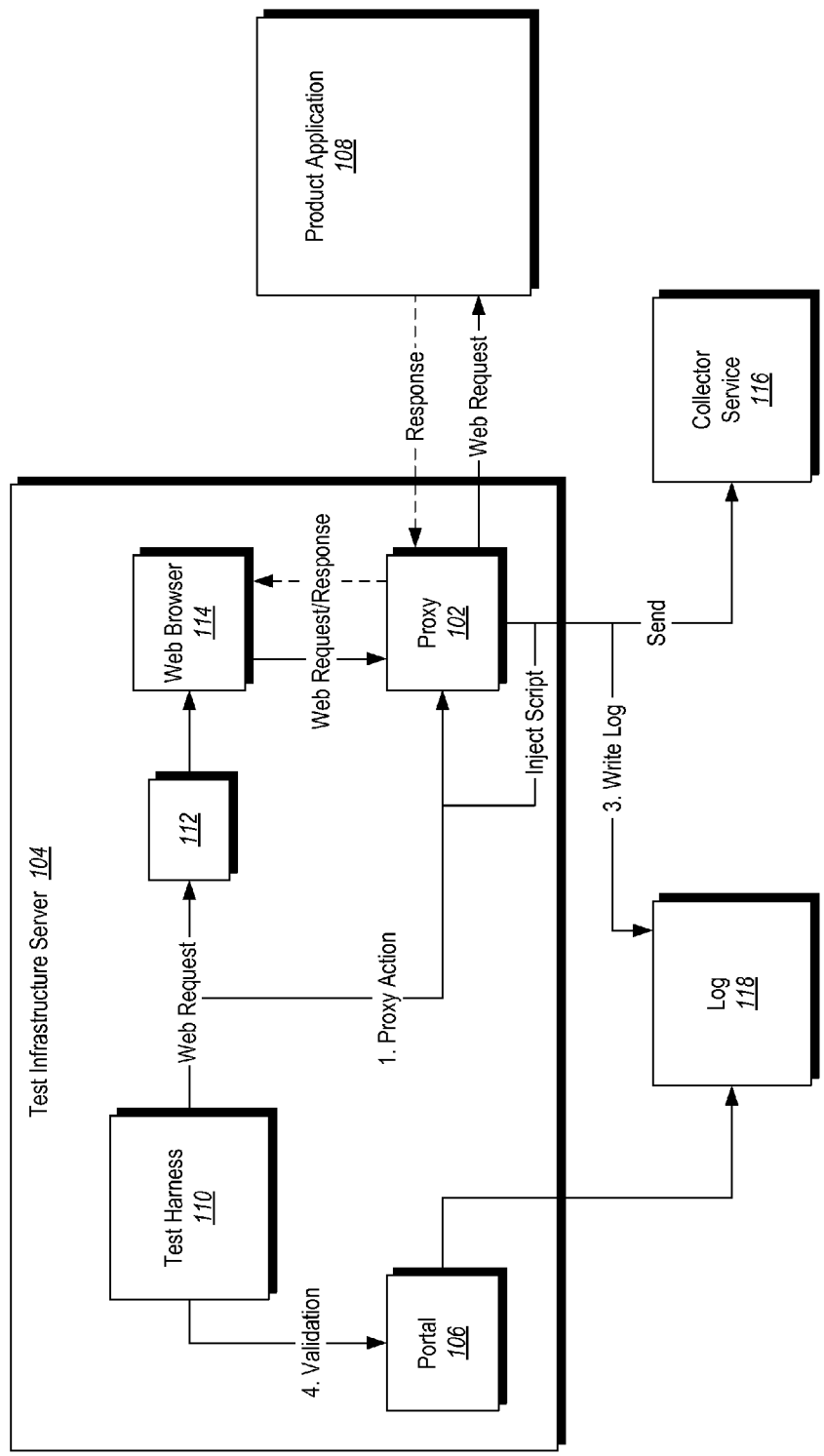
FIG. 1 illustrates a test infrastructure server interacting with a web application to monitor the web application.

Referring now to FIG. 1, embodiments herein implement a solution that uses a web proxy 102 to implement a non-intrusive snippet instrumentation approach. This can be used to implement a solution that does not require any code changes to a target application before certifying that the application is completely safe to use with a monitoring script snippet. The web proxy 102 may have various supported features. For example, the web proxy 102 may be configured to acts as a middleman for all traffic between browser and the target web application.

Alternatively or additionally, the web proxy may be configured to processes response from web applications and insert snippets at the right place of the received resources so that the application does not break, where broken application code does not function as intended or at all as a result of inserted script code. For example, in some embodiments, the web proxy 102 places snippets in the header above all other script tags. Alternatively, the web proxy 102 may place snippets in a footer of a resource from a web application.

The web proxy 102 may have rules that differentiate which resource request's responses should be updated and which should not be updated. For example, some embodiments may be configured such that the web proxy 102 does not add an instrumentation snippet in certain response resources such as image files, text files, json data etc.

The web proxy 102 may be configured to handle both requests to secure web pages (https) and also regular http traffic by using Certificates.

The web proxy 102 may include functionality to sniff traffic from a number of various popular web clients. For example, embodiments may include functionality for sniffing traffic from Internet Explorer® available from Microsoft Corporation of Redmond, Wash., Chrome available from Google Corporation of Mountain View, Calif., Safari available from Apple Corporation of Cupertino, Calif., and Firefox available from Mozilla of Mountain View, Calif. browsers for most of their various versions.

Embodiments can be used to provide a proof of concept for potential customers (e.g. a web application owner) without doing any code changes to a potential customer's production site. To perform this, embodiments can implement the described solution and emulate real world traffic to the web application. A monitoring solution can immediately collect metrics and provide trending information. Additionally, as most monitoring solutions, such as Microsoft's Tofino CSM, available from Microsoft Corporation of Redmond, Wash., Google analytics available from Google Corporation of Mountain View, Calif., New Relic available from New Relic Inc. of San Francisco, Calif., etc., all have downloadable scripts for use with their monitoring solutions, embodiments can simply add a small script to an application resource which will cause a larger script to be downloaded from the appropriate monitoring solution provider. This can be done iteratively for different monitoring solution providers such that a comparison of the different providers can be generated to help direct a potential customer toward a particular monitoring solution based on the comparison.

Embodiments may further include functionality for providing application break validation in a non-intrusive way to ensure that instrumentation does not break application code. Embodiments can verify possible application scenarios from a customer point of view without actually deploying a script snippet to a production site but by simply employing the illustrated solution.

Some embodiments implement a new framework for web application monitoring verification. In the illustrated example, three components are used: A test infrastructure server 104, a portal 106 to show monitoring results, and a target web application 108.

The test infrastructure server 104, in the example illustrated has four components of note. The first is a test harness 110 that drives automated testing. One such test harness may be MSTest, a command line utility that executes unit tests in Visual Studio, both available from Microsoft Corporation of Redmond Wash. The second component is a user interface (UI) automation framework 112 which helps to emulate user interaction with web applications. An example of such a framework is Selenium, which is a browser automation tool available from seleniumhq.org. The third component is a custom proxy 102 that helps intercept traffic and instrument application code with monitoring snippets. The custom proxy 102 applies a script snippet used in instrumentation. In some embodiments, the custom proxy 102 is an IIS proxy available from Microsoft Corporation of Redmond Wash. that has been customized to apply script snippet code. The fourth component of the test infrastructure server 104 is one or more web browser(s) 114.

The target application 108 is any potential production application or internal application which is the target for monitoring.

The portal 106 is a system component where embodiments can verify the monitoring results for the target application 108.

Embodiments can provide a number of benefits and additional functionality. For example, operators, management service providers, or even sales personnel doing proof of concept demonstrations can enable use or prove analytic solution technology without involving a developer. This is can be very beneficial as changing code is can be an expensive, time consuming, or otherwise troublesome proposition. In some cases, changing code can be essentially an unavailable option. For example, if an application is running at different managed hosting service providers, sales personnel cannot instrument the code for each of the application providers.

Further, embodiments may be implemented where, using the same version of application code, administrators can make various decision on what portions of code, which code, what uses of code, etc. should be instrumented. For example, the proxy may be configured to only instrument code received as a result of requests from certain users or replies from certain applications. Alternatively or additionally the proxy may be configured to only instrument code received as a result of certain types of requests or certain types of replies from the application. Factors that could be used by the proxy may be, but are not limited to, user role, application data type, geographic location of requestor or application, time, etc.

Figure 2:
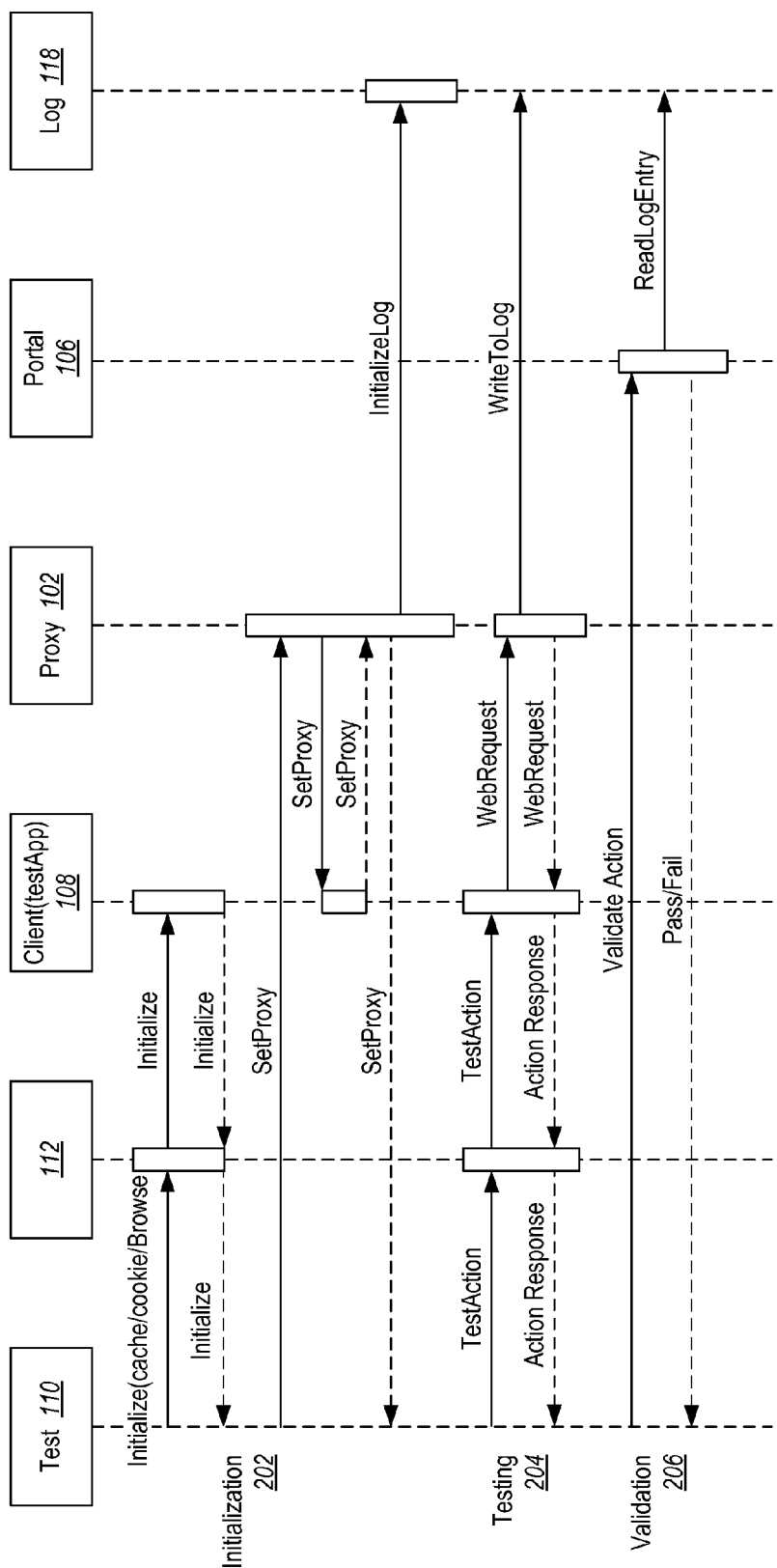
FIG. 2 illustrates process flows for monitoring a web application.

Referring now to FIG. 2, a process for monitoring and validation is illustrated. FIG. 2 illustrates that the process includes four phases: initialization phase 202, testing phase 204, and validation phase 206.

In the initialization phase 202, the test harness 110 starts the proxy 102. The test harness 110 also changes the web browser's proxy's setting to redirect traffic to the proxy 102. The test harness 110 will also save the expected metrics like response time, time to first byte, etc. in an XML file for later use. This can be obtained by first browsing the application 108 for the scenario and collecting the information using tools like native browser debugging tools.

For the testing phase 204, as part of the test scenario, the test harness 110 interacts with the web application 108 via a browser 114 by using the UI automation framework 112. For example, the test harness 110 can cause the UI automation framework to "click" various operations of interest in the browser 114 in sequence to complete a given scenario. The web requests (e.g. resource requests, page and Ajax calls, etc.) go via the proxy 102. The proxy 110 sends the operations to a portal 106. Note that some of the requests contain metrics collected by the monitoring script which will be saved separately for later use. The web responses received from web application 108 are also intercepted by the proxy 102 and sent to the portal 106. The proxy 102 appends a "script snippet" that is specific to the monitoring solution for monitoring and passes the response back to browser 114. The snippet will have details of service endpoints to route the collected metrics. More details of appending a snippet are set forth below:

Embodiments may include functionality for smart snippet placement. It may be important to place the snippet at the right place in the web response so that the snippet will intercept web requests to collect metrics. Some embodiments intelligently look for a head tag and append the snippet as the foremost script among all the scripts present in the head tag. This way, web requests from other scripts also get intercepted in their response by a monitoring script. The following illustrates an algorithm to intuitively find where to appropriately insert a snippet into a response:

```
string Instrument(string html)
{
    Step 1. Find how many scripts are present in the HTML content by matching for regular expression:
        (<\s*script[ >]*>
    Step 2: If number script element is found in Step 1, go to Step 3, else go to Step 4
    Step 3: Append the snippet at the beginning of the first found script
       in Step 1
    Step 4: If <body> tag exists in the content and no <head> tag, add <head> tag before <body> and insert script snippet inside it.
    Step 5: If <body> tag does not exist in the content,
        Case 1: if html open tag exist then add head tag with snippet after it,
            for ex: <html>..<head> + snippet + </head>.
        Case 2: if no html open tag exist then add head tag with script after doctype tag,
            for ex: <!doctype.. <head> + snippet + </head>.
    Step 6: return the instrumented html
}
```

Embodiments may further include functionality for determining which files to append a snippet. Not all web responses need to have a monitoring script snippet appended. For example: an image files or a text responses may not need to have a snippet attached. Embodiments support filtering with filters that can be specified in an xml file. In particular, embodiments may support what response types to not append what web responses to which a snippet should not be appended. For example, one may not want to monitor some specific web response. Below is an example schema for specifying filters:

```
<?xml version="1.0" encoding="utf-8"?>
<xs:schema id="Filters"
    targetNamespace="http://ScriptInjectorProxy/Filters.xsd"
    elementFormDefault="qualified"
    xmlns="http://ScriptInjectorProxy/Filters.xsd"
    xmlns:sip="http://ScriptInjectorProxy/Filters.xsd"
    xmlns:xs="http://www.w3.org/2001/XMLSchema">
<xs:element name="Filters">
    <xs:complexType mixed="true">
        <xs:sequence>
            <xs:element minOccurs="0" maxOccurs="unbounded" name="Filter" type="sip:filter"/>
        </xs:sequence>
    </xs:complexType>
</xs:element>
<xs:complexType name="filter">
    <xs:attribute name="value" use="required"></xs:attribute>
    <xs:attribute name="compareType" type="compareType" use="required">
    </xs:attribute>
</xs:complexType>
<xs:simpleType name="compareType">
    <xs:restriction base="xs:string">
        <xs:enumeration value="Contains" />
        <xs:enumeration value="NotContains" />
    </xs:restriction>
</xs:simpleType>
</xs:schema>
```

And the following illustrates one example algorithm to find application responses types to insert a monitoring snippet:

```
//Check and return if the response for a web request is valid type to
which
snippet can be inserted
// return false if snippet is not to be inserted, else true
```

```
bool IsResponseFitForSnippetInsertion(string html)
{
    Step 1: Check if the current file matches filter criterion set by Client,
set variable
        filterCriterionNotSatisfiled.
    Step 2: Verify if the file is html doc type matching regular expres-
sion:
        (^(\s|<!--.*-->)*<!DOCTYPE HTML[^>]*>), set Variable
        hasHtmlDoctype
    Step 3: Verify if the file is html type matching regular expression:
        (<\s*html[^>]*>), set hasHtmlTagtype
    //Return FALSE or TRUE based on above checks
    return (!filterCriterionNotSatisfiled || hasHtmlDoctype ||
    hasHtmlTagtype)
}
```

The snippet that is appended by the proxy 102 may be specific to a particular monitoring solution. For example, the snippet may be a small snippet that invokes a particular solution. When such a snippet is executed, this typically results in a larger script being delivered to a browser 114 from a monitoring solution, such as is illustrated by the collector service 116 that collects the metrics pertinent to the particular solution and stores the metrics in a log 118. In some embodiments, different snippets can be added simultaneously or iteratively to compare different monitoring solutions or to use different monitoring solutions together to obtain different data.

Embodiments may be configured to handle secure pages. As many web applications have authentication/authorization, embodiments may support authentication/authorization so that embodiments can intercept secure web requests/responses. To perform this, embodiments may create a root certificate on the test infrastructure server 104 and create certificates signed by the test infrastructure server 104 to be used for access over https.

Returning once again to FIG. 2, the processes there illustrate a validation phase 206. The metrics collected can be verified against expected data by a portal 106. The expected metrics for the scenario are saved in an XML file to be used in comparison after testing phase 204. After emulating the scenario via the UI automation framework 112 against the web application 108, the metrics collected by the web application will be used against the expected data as specified. If the metrics do not match, it means there is something wrong with the monitoring solution's approach in collecting the metrics.

The following illustrates an algorithm for verifying the expected data against result data:

```
Bool VerifyLogForScenario(string logFile, string ScenarioExpectedMetricsXml)
{
    Step 1: Read all the lines from the proxy log for Scenario under test.
    Step 2: Find lines specifically collected by analytics script & Parse the page metrics like response time,
browser and visitor metrics, also extract the ajax metrics
    Step 3: From the input XML with metrics information about expected, compare metric by metric with
expected
data.
        Case 1: For metrics that need exact match like screen width, height or visitor information—match for
exact
values.
        Case 2: For metrics that don't need exact match like response time, time to first byte, content loadind
time—
match by allowing a standard deviation from expected value by 10% max. if expected value is X, the match suc-
ceeds
if 1.1X <= real value 0.9X, else no match.
    Step 4: If any single metric mismatches from the expected values, return scenario failed.
}
```

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
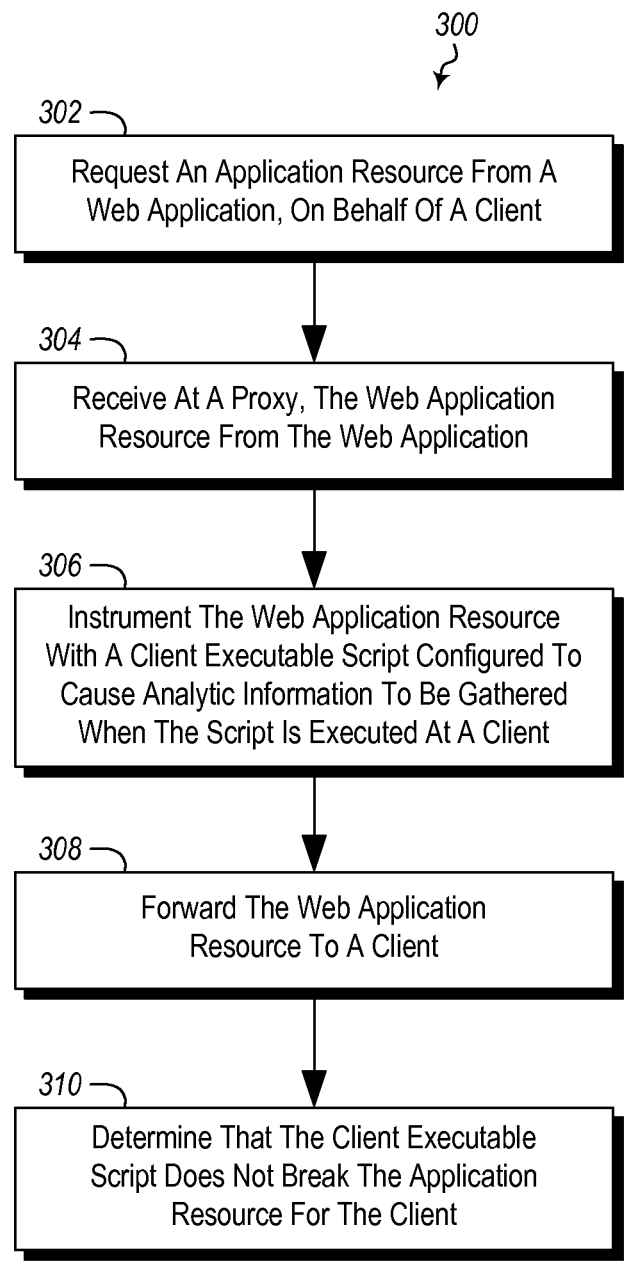
FIG. 3 illustrates a method of a method of gathering web application analytic information.

Referring now to FIG. 3, a method 300 is illustrated. The method 300 may be practiced in a web application computing environment. The method 300 includes acts for gathering web application analytic information. The method 300 includes a proxy requesting an application resource from a web application, on behalf of a client (act 302). For example, as illustrated in FIG. 1, the proxy may request resources from the production application 108 on behalf of the web browser 114.

The method 300 further includes receiving at the proxy, the web application resource from the web application (act 304). For example, as illustrated in FIG. 1, the proxy 102 may receive resources from the production application 108.

The method 300 further includes, at the proxy, instrumenting the web application resource with a client executable script configured to cause analytic information to be gathered when the script is executed at a client (act 306). For example, the proxy 102 may instrument the resources received from the production application 108 with an executable script.

The method further includes forwarding the web application resource to a client (act 308). For example, as illustrated in FIG. 1, the proxy 102 may forward the instrumented web application resource, with the browser executable script, to the browser 114.

At the browser, the browser executable script may be executed to cause analytic information to be gathered. For example, the browser 114 may execute the script inserted by the proxy 102 into the resource obtained from the production application 108. This may cause analytic information to be generated and/or gathered by a collector service 116 and stored in a log 118.

The method 300 further includes determining that the client executable script does not break the application resource for the client (act 310). In particular, by providing the instrumented web application resource to the client, it can be determined whether or not the client can consume (e.g. execute a script resource) the instrumented web application resource properly, in that instrumenting the resource does not cause it to be unusable or to be altered in deleterious ways.

The method 300 may further include, as a result of an entity indicating to a web browser to obtain a web application resource, receiving a request from the web browser requesting from the proxy, the web application resource. For example, test harness 110 in conjunction with the automation framework 112 may indicate to the browser 114 that a resource should be obtained from the production application 108. This may cause the web browser 114 to request the resource from the proxy 102.

The method 300 may be practiced where instrumenting the web application resource comprises placing the client executable script above one or more other scripts in the web application resource so that analytic information can be captured for the other scripts. For example, the client executable script may be placed above a first occurring script in a header so that all other scripts are subject to the analytic capturing. Examples are illustrated above illustrating how a script can be strategically placed in a resource to capture desired analytic information. For example, in some embodiments, the method may be practiced where placing the browser executable script includes placing the client executable script inside of a head section of the application resource.

Alternatively or additionally, the method 300 may be practiced where instrumenting the web application resource comprises placing the client executable script in a footer.

The method 300 may further include determining that the web application resource belongs to a set of web application resources that are to be instrumented as opposed to a set of resources that should not be instrumented. For example, as illustrated above, certain web resources such as htm files, html files, asp.net files, or other customer configured files will be instrumented, whereas other resources such as image files, text files, json data will not be instrumented.

The method 300 may be practiced where instrumenting the web application resource comprises placing a bootstrap script in the web application resource which calls a commercially available analytic service. For example, as illustrated above, a small script may be placed into a resource that causes a larger script to be downloaded from a commercial provider, such as Tofino available from Microsoft Corporation of Redmond Wash., Google Analytics available from Google Corporation of Mountain View, Calif., Yahoo! Web analytics available from Yahoo! Inc. of Sunnyvale, Calif., GoStats available from gostats.com, extreme tracking available from extremetracking.com, Clicky available from Roxr Software of Portland, Oreg., etc. In some such embodiments, the acts may be repeated with different analytic service providers. A comparative report of the analytic service providers may be created and provided to a consumer to help the consumer in determining what analytic solution to select for implementation.

The method 300 may further include providing the instrumented web application resource to a plurality of different web clients to ensure that the instrumentation does not cause substantial adverse effects to the web application. For example, while FIG. 1 shows a single browser 114, it should be appreciated that several different browsers could be included in the test infrastructure server 104 and that each of the browsers could be tested to ensure that the inserted script does not "break" the resource with respect to the different browsers.

The method 300 may further include determining a user role of a user requesting the web application resource. In such embodiments, instrumenting the web application resource with a client executable script configured to cause analytic information to be gathered when the script is executed at a client is performed based on the determination of the user role. In particular, if a user at a browser, where the user has a certain role, such as an administrator, or other role, application data returned as a result of the request will be instrumented because of the user role. Similar embodiments may be implemented for geographic origin of a user, time that a request is made, geographic location of the web application, etc.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

In its most basic configuration, a computing system typically includes at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system. The computing system may also contain communication channels that allow the computing system to communicate with other message processors over, for example, the network.

Embodiments described herein may comprise or utilize a special-purpose or general-purpose computer system that includes computer hardware, such as, for example, one or more processors and system memory, as discussed in greater detail below. The system memory may be included within the overall memory. The system memory may also be referred to as "main memory", and includes memory locations that are addressable by the at least one processing unit over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "MC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a web application computing environment comprising one or more processors, a method of gathering web application analytic information, the method comprising:
   at a proxy, requesting a web application resource from a web application on behalf of a client requesting the web application resource;
   at the proxy, receiving the web application resource from the web application;
   at the proxy, determining one or more filtering criteria associated with the web application resource, including at least one of: (i) a resource type of the web application resource, (ii) a role of a user associated with the client requesting the web application resource, (iii) a geographical location of the client requesting the web application resource, or (iv) a time associated with requesting the web application resource;
   at the proxy, comparing the one or more filtering criteria to one or more filtering rules to determine whether or not the web application resource should be instrumented;
   at the proxy, and based at least on determining that the web application resource should be instrumented when comparing the one or more filtering criteria to the one or more filtering rules, instrumenting the web application resource with a client executable script of an analytic information provider, the client executable script being configured to cause analytic information to be gathered when the script is executed at the client;
   at the proxy, forwarding the instrumented web application resource to the client; and
   based at least on analytics information generated at the client based on execution of the client executable script, determining that the client executable script does not break the web application resource for the client.

2. The method of claim 1, further comprising, as a result of an entity indicating to a web browser to obtain the web application resource, receiving a request from the web browser requesting the web application resource from the proxy.

3. The method of claim 1, wherein instrumenting the web application resource comprises placing the client executable script above one or more other scripts in the web application resource, so that analytic information can be captured for the one or more other scripts.

4. The method of claim 3, wherein placing the client executable script comprises placing the client executable script inside of a head section of the web application resource.

5. The method of claim 1, wherein instrumenting the web application resource comprises placing the client executable script in a footer.

6. The method of claim 1, wherein instrumenting the web application resource comprises placing a bootstrap script in the web application resource which calls an analytic service.

7. The method of claim 6, further comprising repeating the acts of claim 6 with different analytic service providers and creating a comparative report of the analytic service providers.

8. The method of claim 1, further comprising providing the instrumented web application resource to a plurality of different web clients to ensure that the instrumentation does not cause substantial adverse effects to the web application.

9. The method of claim 1, wherein determining the one or more filtering criteria comprises determining the role of the user associated with the client requesting the web application resource, and wherein comparing the role of the user to the one or more filtering rules comprises determining that the web application resource should be instrumented based on the role of the user.

10. The method of claim 1, wherein determining the one or more filtering criteria comprises determining the geographical origin of the client requesting the web application resource, and wherein comparing the geographical origin of the client to the one or more filtering rules comprises determining that the web application resource should be instrumented based on the geographical origin of the client.

11. The method of claim 1, wherein determining the one or more filtering criteria comprises determining the time associated with requesting the web application resource and, wherein comparing time associated with requesting the web application resource to the one or more filtering rules comprises determining that the web application resource should be instrumented based on the time associated with requesting the web application resource.

12. A hardware storage device having stored thereon computer executable instructions representing a proxy and that, when executed by one or more processors, cause the proxy to perform at least the following:
   request a web application resource from a web application on behalf of a client requesting the web application resource;
   receive the web application resource from the web application;
   at the proxy, determine one or more filtering criteria associated with the web application resource, including at least one of: (i) a resource type of the web application resource, (ii) a role of a user associated with the client requesting the web application resource, (iii) a geographical location of the client requesting the web application resource, or (iv) a time associated with requesting the web application resource;
   at the proxy, compare the one or more filtering criteria to one or more filtering rules to determine whether or not the web application resource should be instrumented;
   based at least on determining that the web application resource should be instrumented when comparing the one or more filtering criteria to the one or more filtering rules, instrument the web application resource with a client executable script of an analytic information provider, the client executable script being configured to cause analytic information to be gathered when the script is executed at the client;
   forward the instrumented web application resource to the client; and
   based at least on analytics information generated at the client based on execution of the client executable script, determine that the client executable script does not break the web application resource for the client.

13. The hardware storage device of claim 12, the computer executable instructions also including instructions that when executed, cause the proxy to, as a result of an entity indicating to a web browser to obtain the web application resource, receive a request from the web browser requesting, from the proxy, the web application resource.

14. The hardware storage device of claim 12, wherein instrumenting the web application resource comprises placing the client executable script above one or more other scripts in the web application resource, so that analytic information can be captured for the one or more other scripts.

15. The hardware storage device of claim 14, wherein placing the client executable script comprises placing the client executable script inside of a head section of the web application resource.

16. The hardware storage device of claim 12, wherein instrumenting the web application resource comprises placing the client executable script in a footer.

17. The hardware storage device of claim 12, further comprising computer executable instructions that when executed by one or more processors cause determining that the web application resource belongs to a set of web application resources that are to be instrumented as opposed to a set of resources that should not be instrumented.

18. The hardware storage device of claim 12, wherein instrumenting the web application resource comprises placing a bootstrap script in the web application resource which calls an analytic service.

19. The hardware storage device of claim 18, further comprising repeating the acts of claim 18 with different analytic service providers and creating a comparative report of the analytic service providers.

20. The hardware storage device of claim 12, the computer executable instructions also including instructions that when executed, cause the proxy to provide the instrumented web application resource to a plurality of different web clients to ensure that the instrumentation does not cause substantial adverse effects to the web application.

21. A system for gathering web application analytic information, the system comprising:
one or more processors; and
one or more computer-readable media having stored thereon computer-executable instructions that are executable by the one or more processors to cause the system to perform at least the following:
request a web application resource from a web application on behalf of a client requesting the web application resource;
determine one or more filtering criteria associated with the web application resource, including at least one of: (i) a resource type of the web application resource, (ii) a role of a user associated with the client requesting the web application resource, (iii) a geographical location of the client requesting the web application resource, or (iv) a time associated with requesting the web application resource;
compare the one or more filtering criteria to one or more filtering rules to determine whether or not the web application resource should be instrumented;
based at least on determining that the web application resource should be instrumented when comparing the one or more filtering criteria to the one or more filtering rules, instrument the web application resource with a client executable script configured to cause analytic information to be gathered when the script is executed at the client;
forward the instrumented web application resource to the client and
based at least on analytics information generated at the client based on execution of the client executable script, determine that the client executable script does not break the web application resource for the client.

22. The system of claim 21, wherein one or more automation components are configured to request web application resources by interfacing with the web application, and the one or more automation components comprise one or more of:
a test harness configured to drive automated testing; or
a UI automation framework configured to help emulate user interaction with web applications.

23. The system of claim 21, wherein instrumenting the web application resource comprises placing the client executable script above one or more other scripts in the web application resource, so that analytic information can be captured for the one or more other scripts.

* * * * *